Nov. 14, 1939.　　　　F. R. CHESTER　　　　2,180,329
GAME APPARATUS
Original Filed May 23, 1935　　9 Sheets-Sheet 1

INVENTOR
*Frank R. Chester*
BY
*Smith & Tuck*
ATTORNEYS

Nov. 14, 1939.  F. R. CHESTER  2,180,329
GAME APPARATUS
Original Filed May 23, 1935   9 Sheets—Sheet 4

INVENTOR
Frank R. Chester
BY
Smith & Tuck
ATTORNEYS

Nov. 14, 1939.                    F. R. CHESTER                    2,180,329
                                  GAME APPARATUS
                      Original Filed May 23, 1935    9 Sheets-Sheet 5

INVENTOR
Frank R. Chester
BY
Smith & Tuck
ATTORNEYS

Nov. 14, 1939.  F. R. CHESTER  2,180,329
GAME APPARATUS
Original Filed May 23, 1935    9 Sheets—Sheet 6

INVENTOR
Frank R. Chester
BY
Smith & Tuck
ATTORNEYS

Nov. 14, 1939.        F. R. CHESTER        2,180,329
GAME APPARATUS
Original Filed May 23, 1935    9 Sheets-Sheet 7

INVENTOR
Frank R. Chester
BY
Smith & Tuck
ATTORNEYS

Nov. 14, 1939.　　　　F. R. CHESTER　　　　2,180,329
GAME APPARATUS
Original Filed May 23, 1935　　9 Sheets-Sheet 2

INVENTOR
Frank R. Chester
BY
Smith & Tuck
ATTORNEYS

Nov. 14, 1939.　　　　　F. R. CHESTER　　　　　2,180,329
GAME APPARATUS
Original Filed May 23, 1935　　9 Sheets-Sheet 9

INVENTOR
Frank R. Chester
BY
Smith & Tuck
ATTORNEYS

Patented Nov. 14, 1939

2,180,329

UNITED STATES PATENT OFFICE 2,180,329

GAME APPARATUS

Frank R. Chester, Seattle, Wash.

Substituted for abandoned application Serial No. 23,119, May 23, 1935. This application April 7, 1939, Serial No. 266,676

9 Claims. (Cl. 273—89)

My present invention relates to the art of mechanical games and more particularly to a game apparatus.

This application is a substitute for the abandoned application, Serial No. 23,119, filed May 23, 1935.

It is well known that a large number of game boards have been created based upon various national games and sports. The majority of such games, however, fall far short of simulating the actual conditions of play. Too often they are, in effect, just another pin and ball game in which luck plays a too important part. In my present game I have endeavored to simulate as far as possible every condition of play and to, in a large degree, make the winning of a high score a matter of skill, rather than luck. My basic apparatus lends itself to the majority of games played as national games in various countries and to many outdoor sports. For convenience of explanation I have indicated my apparatus as applied to the game of baseball. In my game which is most conveniently played on an incline deck, I provide a batting mechanism which is manually operated through suitable linkage. As the ball is pitched, by mechanical means, the operator can place this ball, after he becomes experienced, with a fair degree of accuracy, in the selected part of the deck. Here it engages a number of rubber bumpers or retarding means, simulating basemen and fielders. These are so arranged that, by skillful placing of the ball, one or more bases may be made by the runner and, under certain conditions, even a home run is possible. Now, I am well aware that even these conditions have been met to a degree in the past. With my present arrangement, however, the ball is always visible just as in a ball game and the ball as it oscillates between various bumpers, holds the player's interest just as a spectator's interest is held on a real ball field.

The principal object of my present game, therefore, is to provide a playing board in which skill must be developed and where the general characteristics of the game of baseball can be faithfully simulated.

A further object of my invention is to provide ball retarding means which will simulate players in the field but which are so arranged that it is not certain just what will be the final disposition of the ball until it is actually on its way to be returned to the pitcher or catcher.

A further object of my present invention is to provide a plurality of blinking lights which will indicate runners off base and which are provided with switching means mechanically operated which will indicate when those runners are put out.

Other and more specific objects will be apparent from the following description taken in connection with the accompanying drawings, wherein.

In carrying out my invention I employ a bat that is adapted to oscillate in a horizontal plane, and the bat is swung at the delivered ball by operating means under control of the operator or player, who depresses an exterior lever for actuating the operating mechanism.

The bat is located between a pitching device and a catching and returning device, in usual position, and these devices include ejectors for the ball, which ejectors are operated from an electric motor conveniently located, and a coin operated mechanism is provided for controlling the operation of the motor. While the motor is in operation power is continuously transmitted to the pitching device and the catching and returning device and these devices are in constantly operative position or condition during a predetermined period of time, or during a period of time in which a specific number of swings may be applied to the bat. Thus, after the coin has been deposited, the bat may be successively swung, by the player or operator, or by two players alternately, up to twelve times, after which the power operating mechanism is disconnected from the pitching device and the catcher and ball-returning device.

The pitching device delivers the ball to the catcher and returning device, and the latter returns the ball to the pitcher if the bat fails to hit the ball. If the swinging bat hits the ball out into the field, the ball is returned by gravity either directly to the pitcher, or indirectly to the pitcher by way of the catcher. A "home run" station is also provided in the outfield to receive a hit ball, and means are provided for ejecting the ball from this station so that it may be returned to the pitcher.

An intermittent, or step by step, mechanism is employed, receiving power from the operating shaft that is driven by the motor, for illuminating runner lights that indicate the positions of the runners as they pass around the bases, and means are also provided for illuminating the first, second and third bases while the game is being played. These illuminating means are rendered operative at the start of the game, and rendered inoperative at the end of the game. Illuminated means are also employed for indicating on a score board the hits and runs made by the players.

Figure 2:
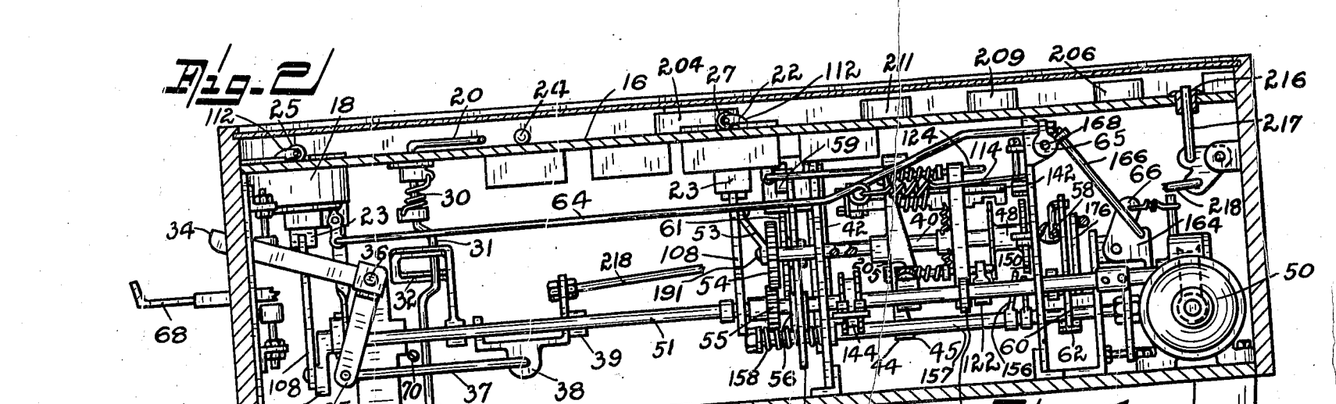
Figure 2 is a longitudinal sectional view, in elevation, of my game board.

Referring especially to Figure 2 it will be seen that the operating parts of the game are enclosed within a box having a longitudinally extending deck in its upper portion which is indicated as 16, and the playing field over this deck is enclosed by a transparent or glass plate 17. The deck may be of any suitable material, and it is preferably supported with the outfield higher than the infield and the catcher's station, so that the ball 24 may roll by gravity to the pitcher's box or station, or, in the event the ball rolls by gravity to the home plate, the ball is returned by the catching and returning mechanism to the pitcher's box.

Figures 1, 3:
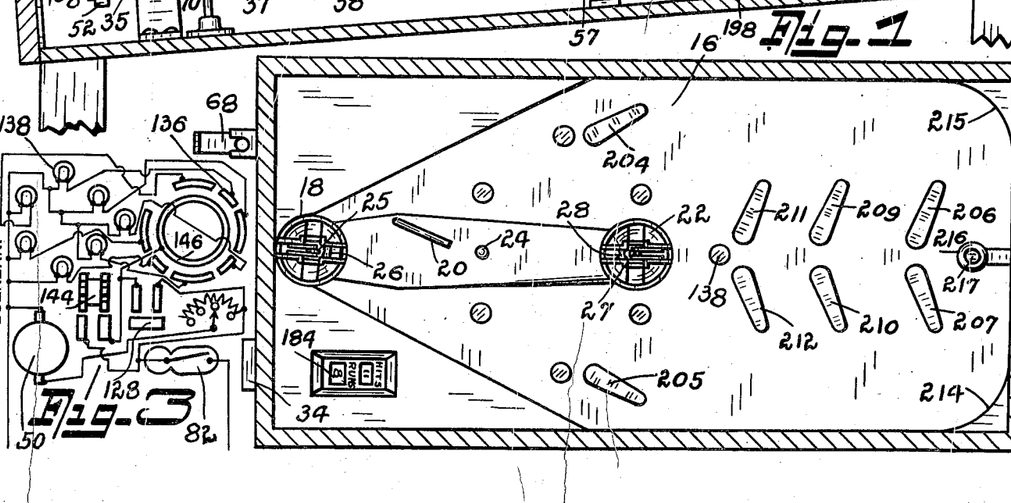
Figure 1 is a top plan view of a game board made after the teachings of my invention.
Figure 3 is a schematic wiring diagram used in my game board, or right hand end of the mechanism shown in Figure 2 but viewed from the opposite side.
Figure 5:
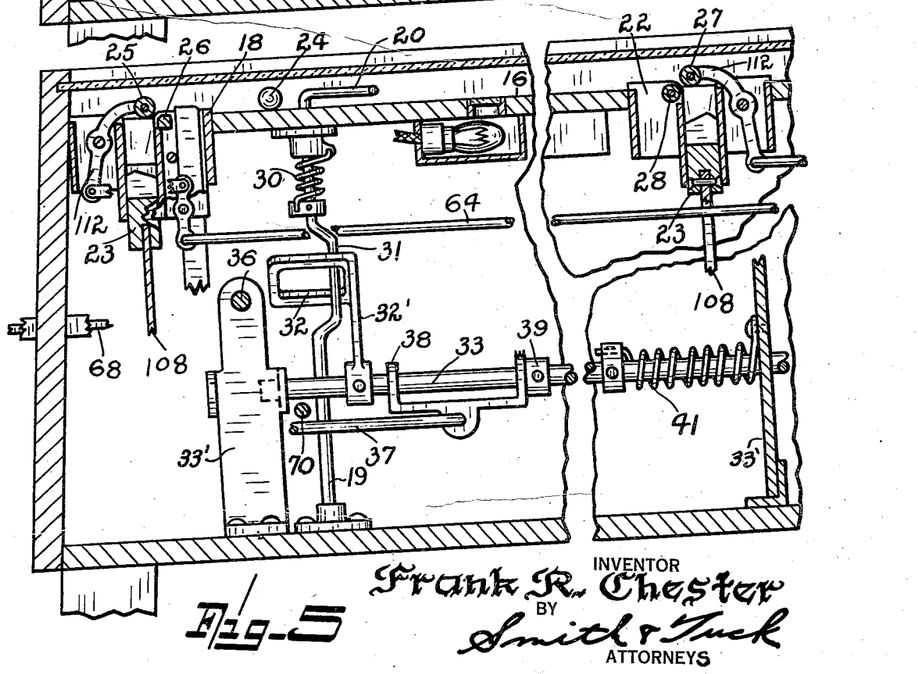

The ball-catching and returning mechanism is indicated as a whole in Figure 1 by the numeral 18; the bat is indicated as 20; and the pitcher's box is indicated by the numeral 22. The catcher's mechanism and the pitcher's mechanism each includes means for ejecting and propelling the ball from one mechanism to the other mechanism, and these ejecting devices are somewhat similar in construction and operation to like devices in my patent numbered 1,885,802. Each of these devices includes a vertically moving ejector or reciprocating piston 23, as in Figure 5, located below the home plate and the pitcher's box, and these ejectors are reciprocating constantly while the game is being played.

In the catching and returning mechanism, the ball 24 is lifted or ejected by the piston 23 up against a yieldingly supported roller 25, and forced between this roller and the stationary lip 26, and this ejecting action returns the ball to the pitcher's mechanism.

In the pitching mechanism the ball is lifted by the ejector or piston 23 and forcibly ejected between a roller 27 having a yielding journal-support, and a complementary freely rotating roller 28. By the co-action of these two rollers 27 and 28, a movement is imparted to the ball as it rolls toward the bat, which renders indefinite the striking of the ball by the swinging bat, thus simulating the swinging of a bat at a curved ball in a ball game.

Bat 20 is formed by bending the upper end of a metal rod or shaft 19, which is journaled in upright position beneath the deck, so that the bat may swing horizontally over and close to the upper face of the deck, and the bat is normally held in position of Figure 1 by a spring 30 coiled about the shaft 19 with one end fixed to the shaft and its other end anchored to a stationary bracket beneath the deck. The shaft 19 of the bat is provided with a crank portion 31 just below the spring 30, and this cam or crank portion is engaged by a link or loop 32 rigid with a crank arm 32' that is fixed on and movable with a longitudinally extending shaft 33 which is supported to slide or reciprocate longitudinally in brackets 33'.

The bat is swung by shifting this shaft 33, and the latter is shifted by depressing the exterior, free end of a bell crank lever 34 that is pivotally supported at 36 within the box. The bell crank lever is pivotally connected at 35 with a link 37 extending parallel with the shaft 33, and this link is pivotally connected with a slide yoke 38 mounted on the shaft 33 between a fixed collar 39 on the shaft and the hub of the arm 32'. The linkage as described is arranged so that as the exterior, free end of the operating lever 34 is depressed by hand, the yoke 38 pushing against collar 39 slides the shaft 33 to the right in Figure 5 against the tension of a spring 41, and the crank shaft 19 is turned, swinging the bat against tension of spring 30 for the purpose of meeting the ball. The spring 41 is designed to absorb excessive shocks imparted to the operating lever 34, and thereby prevent excessive wear and tear on the operating parts.

It will be understood of course that the player is free to operate the lever 34 and swing the bat at the ball as the latter is delivered to the home plate, and he may choose the ball at which he swings, but he is of course limited by the rules of the game to the number of swings of the bat.

Figure 17:
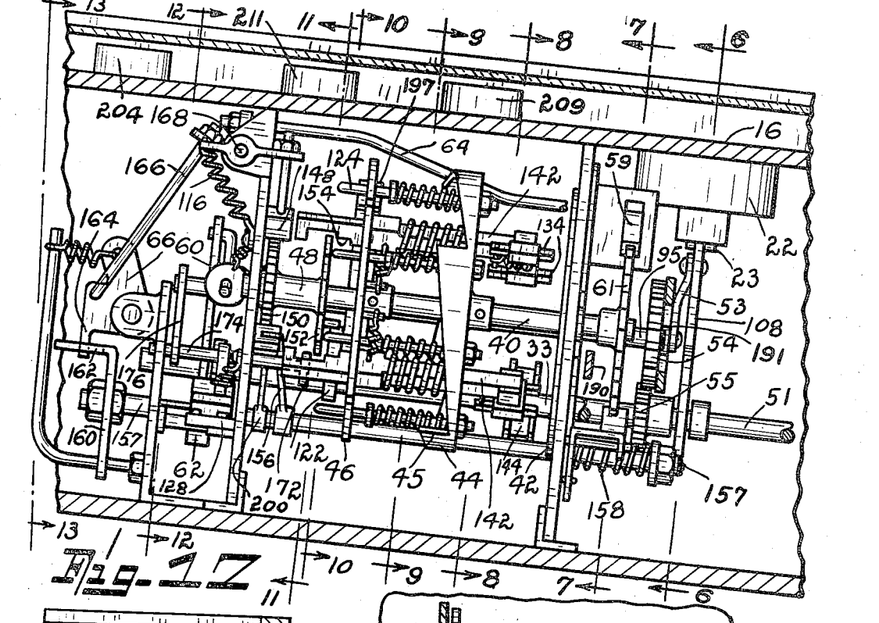
Figure 17 is a fragmentary, vertical sectional view taken near the upper end of my game device and showing in considerable detail the light switching means.
Figure 18:
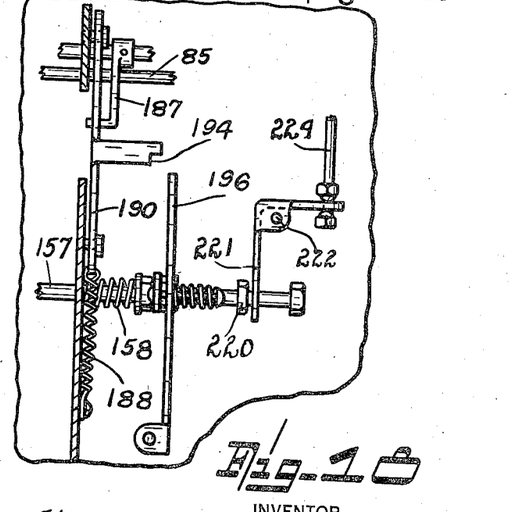
Figure 18 is a fragmentary, sectional view in plan taken along the line 18—18 of Figure 20, certain parts being omitted for sake of clarity.
Figure 19:
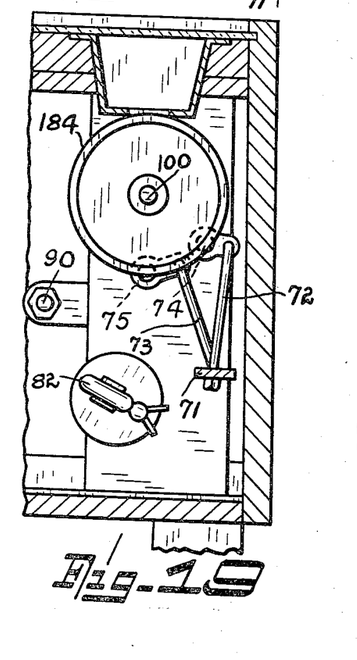
Figure 20:
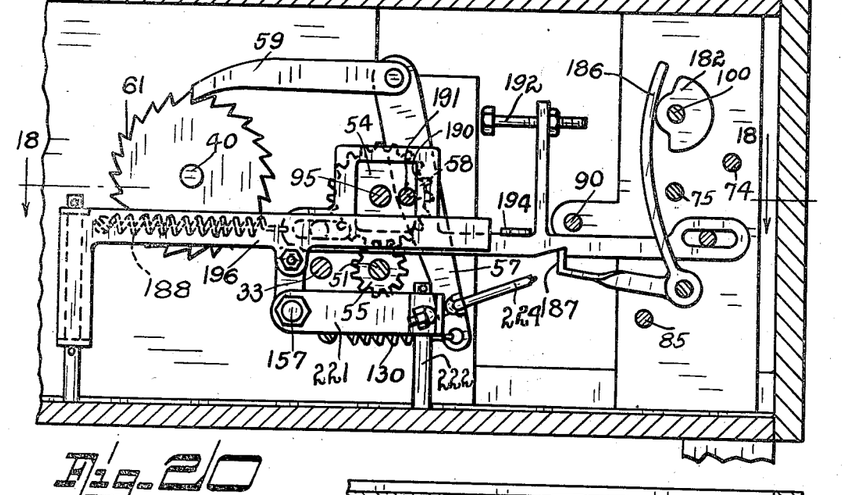

In order to indicate the position and advancement of runners on the bases, and to provide a mechanism that will indicate when men are put out and runs are made, I provide a rotary timing and selecting mechanism, or unit. This unit is mounted upon an intermittently revolvable shaft 40 journaled in suitable bearings. The unit consists essentially of a circular commutator plate 42, a cam plate 44 mounted thereon and having at its periphery four spaced cams, as 45, the selector plate 46, and the release rotor cam unit 48, as indicated in Figure 17.

The power for operating the power-driven devices is provided from an electric motor 50 located within the enclosing box or cabinet, and the motor, through suitable reducing means, drives the longitudinally extending power shaft 51 at a constant speed, continuously, while the game is being played; and from this shaft, through suitable transmitting mechanism, the various parts of the mechanisms are operated.

Figure 4:
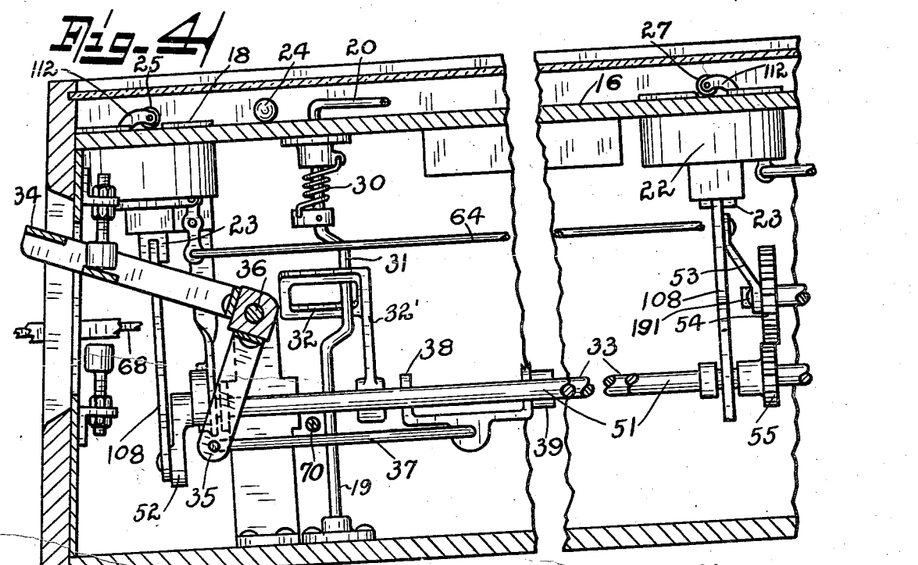
Figures 4 and 5 illustrate in vertical sectional view the pitching, batting and catching mechanism.

The catcher and returning device 18 is driven by crank 52 fixed to the end of shaft 51 in Figure 4, and this crank arm is connected by link 108 to the ejector 23.

The pitching mechanism is operated from the shaft 51 by a suitable crank through a connecting member 53, and the crank is pivoted to the gear 54 which is driven at reduced speed from a gear 55 on the shaft 51, a link 108 also being used to connect the crank with the ejector.

Figure 6:
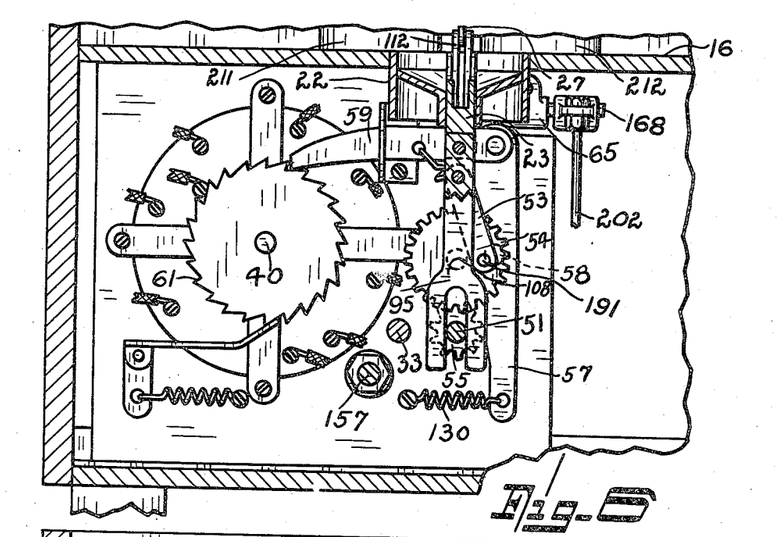
Figures 6, 7, 8, 9, 10, 11, 12 and 13 are cross-sectional views taken along similarly designated sectional lines of Figure 17.
Figure 7:
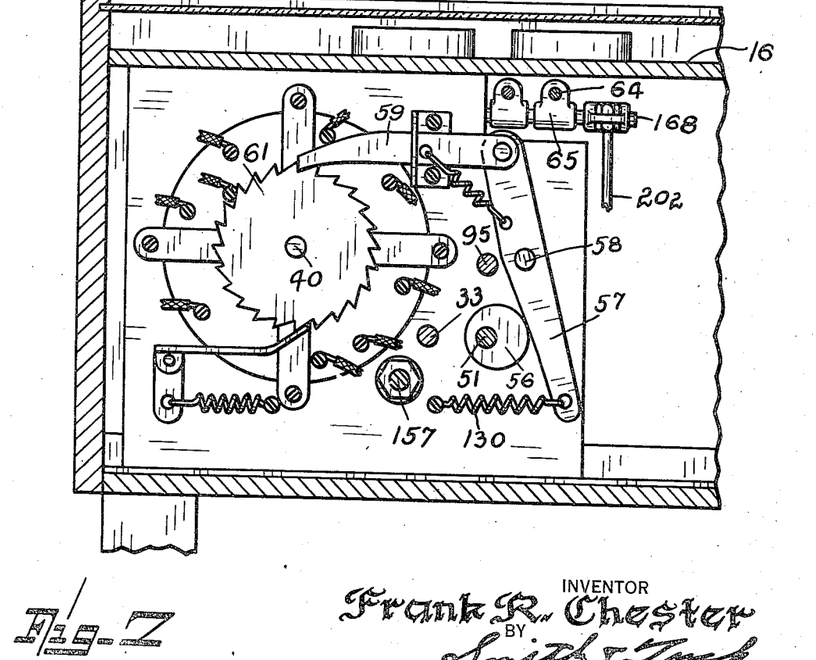

For operating the selecting and controlling unit I employ the intermittently operated shaft 40, which is driven in a step by step movement through means best illustrated in Figures 6 and 7, where an eccentric 56 on shaft 51, oscillates by a cam action the bar 57 which is mounted upon a rock shaft 58, and this bar 57 is provided at its upper end with a pawl 59 that co-acts with a ratchet wheel 61 on the shaft 40.

Figure 12:
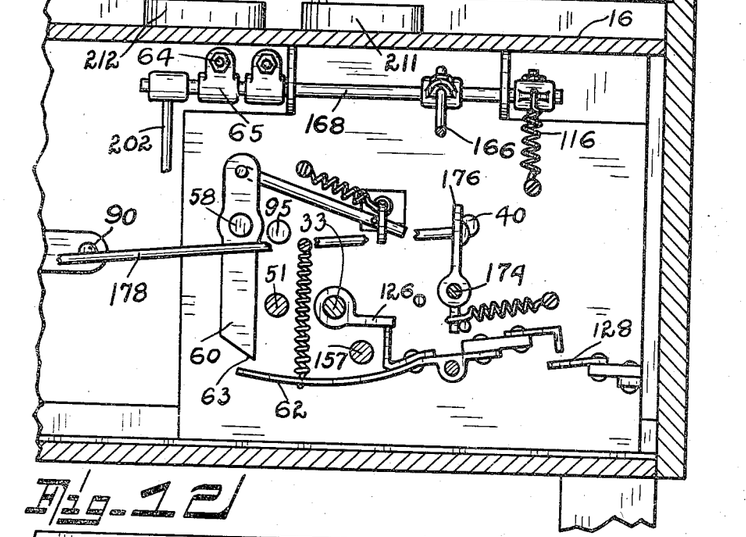
Figure 13:
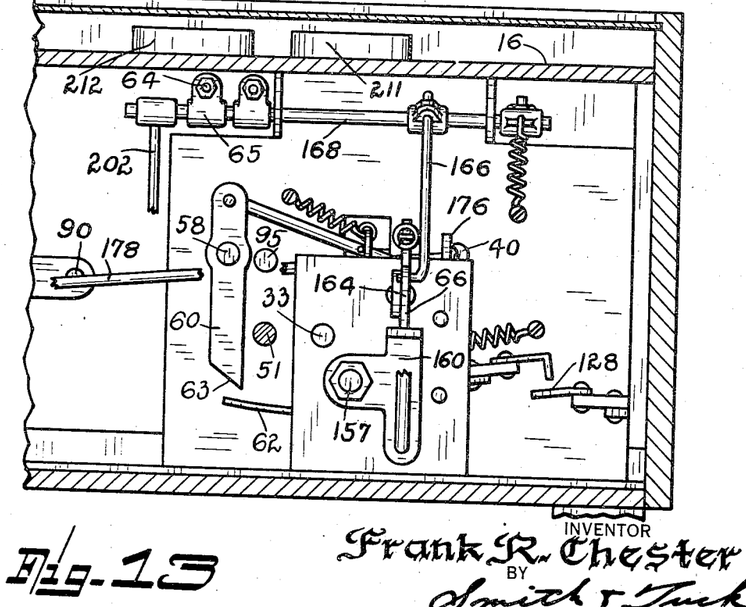

Fixedly secured to the opposite end of shaft 58 is a trip lever 60 shown in Figures 12 and 13 in its released position. As eccentric 56 on shaft 51 is revolved, lever 57 on the rock shaft 58 operating against suitable return springs, drives ratchet 61 in Figure 7 in a step by step manner.

In Figure 12 it will be seen that normally, when the game is not operative, or not being played, the latch 62 engages the lower end 63 of a depending lever 60 mounted on the shaft 58, and holds it in such a manner as to lift arm 57 out of operative contact with eccentric 56. This action is released, however, as soon as the pitching mechanism delivers the ball. This release is effected through a control rod 64 in Figure 5, operating through the rocker shaft assembly 65 to the latch mechanism 66, as in Figure 13. Thus it follows that when the first ball is pitched the game is in play ready to indicate the sequence of plays which follow.

Starting game

Figure 14:
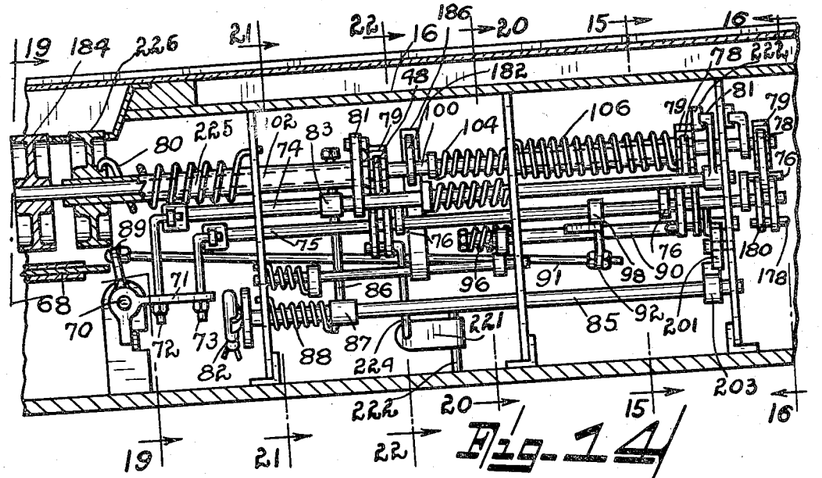
Figure 14 is a fragmentary, vertical sectional view showing in greater detail the element making up the scoring devices.
Figures 15, 16:
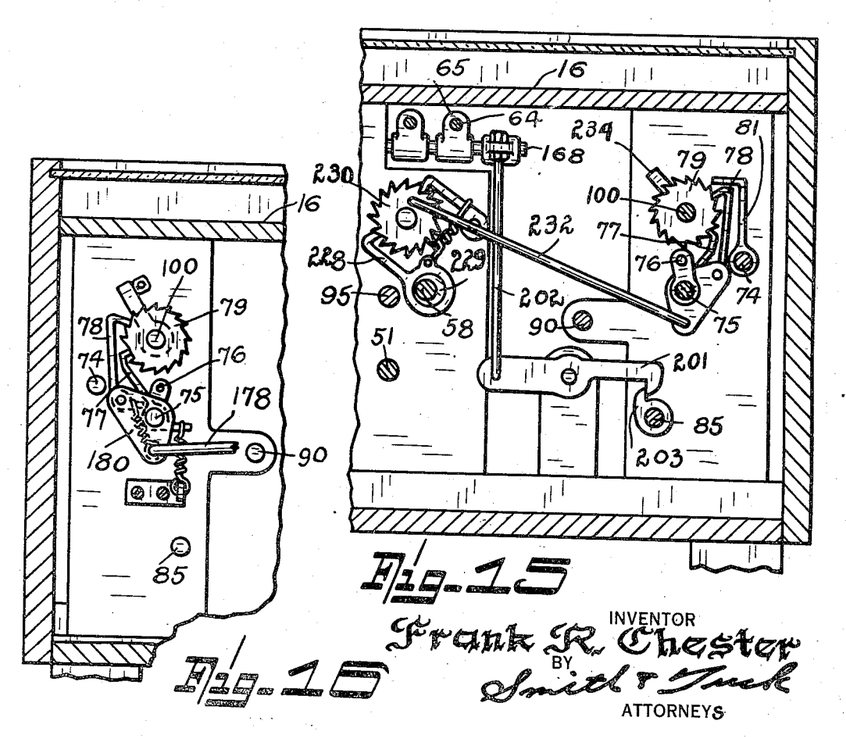
Figures 15, 16, 19, 20, 21 and 22 are cross-sectional views, in fragmentary form, taken along similarly designated sectional lines of Figure 14.
Figure 22:
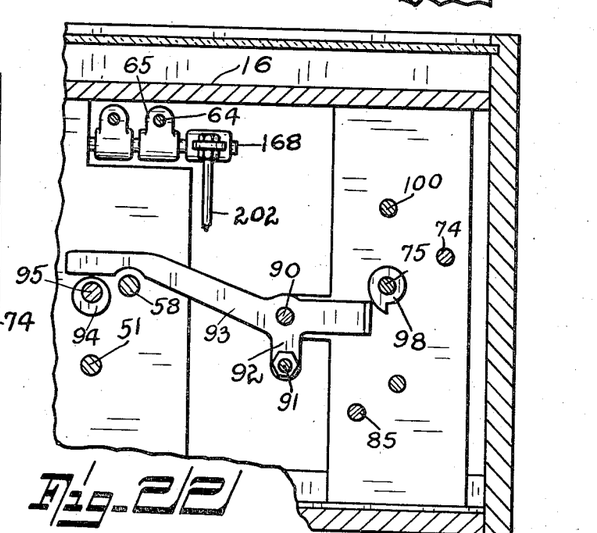

The sequence of operation of my machine is substantially as follows: The play is started by unlocking the mechanism through the conventional coin-release mechanism 68 which causes shaft 70, see Figure 14, to operate on arm 71 by means of links 72 and 73 which pull shafts 74 and 75 in a downward direction causing cams 76 to force the stop and driving pawls 77 and 78, see Figure 16, off the face of ratchet 79 thereby allowing ratchet 79 to swing back by means of spring 80 to a zero position. This ratchet 79 is connected with a release arm 81 for the batting and the timing elements which are fixed on a common shaft 74. Shaft 74, carrying arm 83, compresses spring 84 thereby revolving shaft 85, through the means of rod 86, and arm 87, assisted by spring 88 on shaft 85. This causes mercury switch 82 carried by shaft 85, to revolve and close the power circuit. Shaft 70 also carries arm 89 which causes shaft 90 to be forced backwards through the means of rod 91 and arm 92. Shaft 90 carries a trip-arm 93, Figure 22, with it, thereby causing trip-arm 93 to leave the driving surface of the eccentric 94 which is rotated by shaft 95. When the coin-release mechanism 68 is allowed to return to its neutral position the trip-arm 93 will be forced back on the low side of the eccentric 94 by means of spring 96 which will cause the trip-arm 93 to release cam 98 thereby creating a time lag which will hold the pawls 77 and 78 in an outward position so that the shaft 100 and tube 102 will have time to rotate into their zero position by means of springs 80 and 104 and 106.

Batting ball

The motor 50 will be running at this point as a result of switch 82 closing the circuit and driving shaft 51 through the means of the reduction gears. Shaft 51 will be reciprocating plungers 23 by the means of cranks and connecting links 108. It will be seen that the ball will have returned either to the pitcher or catcher receptacle, by gravity, and that these plungers 23 will carry the ball upward against the roller 25 carried by the rocking arm 112 and through the pressure exerted against the springs 114 and 116 will cause the ball to be propelled across the deck. If the ball was in the catcher's receptacle it will be passed to the pitcher and if it was in the pitcher's receptacle the ball will be passed to the catcher. During the cycle of throwing the ball from the pitcher to the catcher it is necessary for the player or operator to depress or force the hand lever 34 downwards to its fullest extent, thereby causing the bat 26 to rotate which, if the operator is sufficiently skillful, will drive the ball out on the deck. At the same time hand lever 34 forces rod 37 in a rearward direction, also carrying yoke 38, which, in turn, forces shaft 33 through the means of collar 39, in a rearward direction, thereby causing cam 122 off the end of pin 124 causing shaft 33 to rotate some 60 degrees completing the batting stroke.

Operation of runner lights

Figure 8:
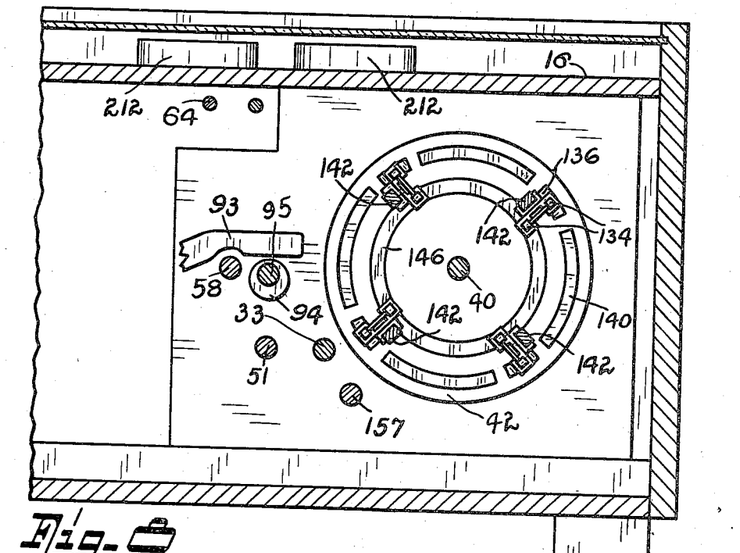
Figure 9:
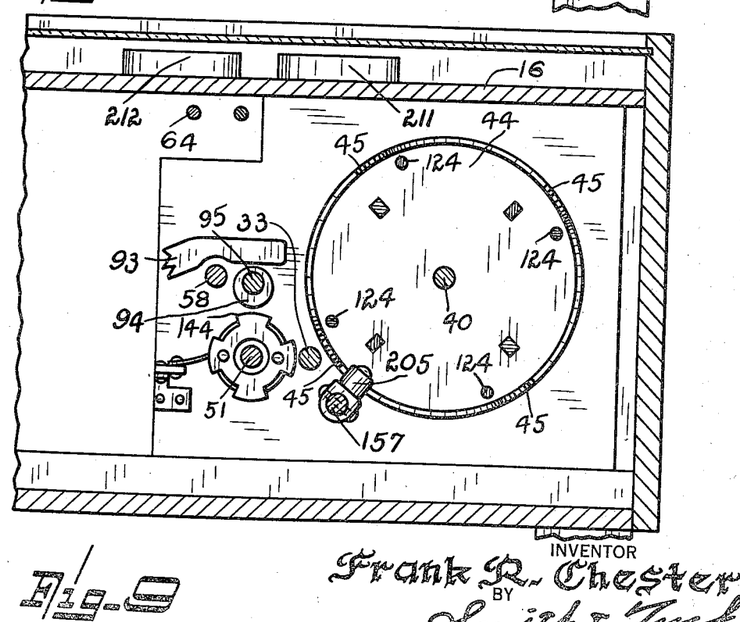
Figure 10:
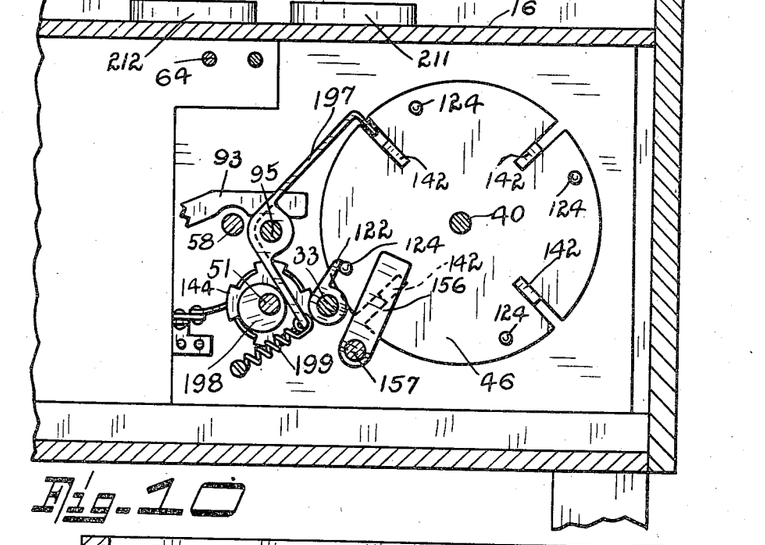
Figure 11:
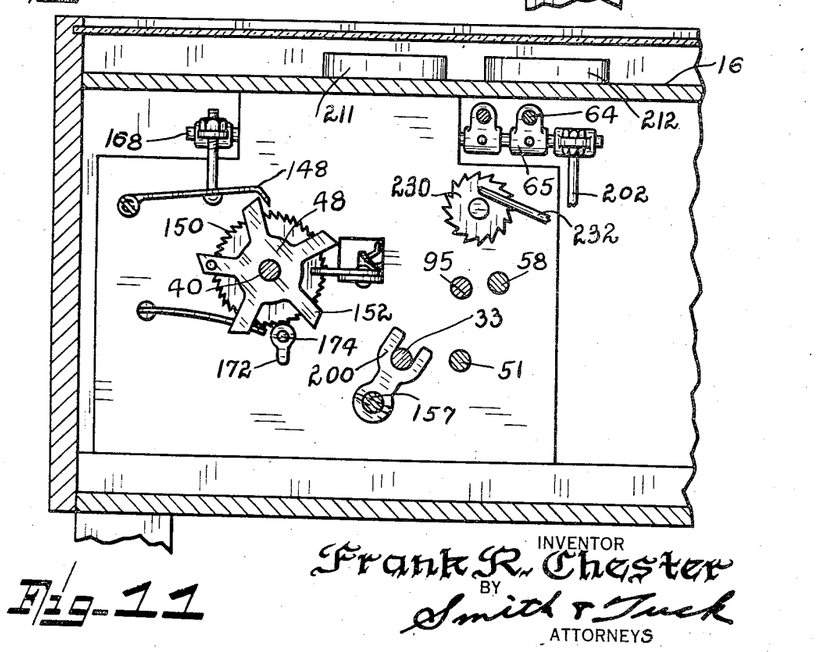

In completing its rotation shaft 33 causes arm 126 to press downward locking pawl 62 thereby taking it out of alignment with arm 57 at the same time opening switch 128 which will allow spring 130 to pull arm 57 against eccentric 56 thereby actuating pawl 59, causing the ratchet wheel 61 to rotate continuously, in a step by step manner, as long as hand lever 34 is held in a downward position. But if hand lever is released into an upward position then pin 124 will pick up cam 122 and force it into its neutral position which will allow locking pawl 62 to raise and close switch 128 at the same time aligning itself with arm 60 and stop the functioning of the pawl thereby bringing ratchet wheel 61 to stop at a position which will bring the brushes 134 in contact with the segment 136 on the commutator which will cause a light number 138 to light at position representing a base on the deck. The movement of the ratchet wheel 61, which is pinned to shaft 40, will cause these brushes 134 to traverse segment 140 by means of flange 46 and arms 142 which are carried by shaft 40. If brushes 134 are completing a circuit by making contact with one of the large segments as shown in Figure 8, a circuit is completed through a light located between the adjoining bases, and this light will be flashing on and off by action of the flasher 144. During this period switch 128, which is in shunt with rotating flasher 144, will be opened, thereby causing the electric current to pass through the rotating flasher which will make and break the circuit and carry the current through the segment 140 and connecting ring 146 by means of the brushes 134 to the lights between bases. During this movement of the ratchet wheel 61, if the ball on the deck should operate rocker arms 112, it will cause locking pawl 148 to contact ratchet 150 thereby locking pin wheel 152 which is supported by shaft 40 and is an idler on shaft 40 but has been revolved by one of the arms 142. This locking action will cause arm 142 to come to its neutral position thereby breaking the electric circuit by means of brushes 134 causing light 138 to go out representing an "out". These arms can only be depressed into a locking position when they come into alignment with cam 156 which is carried by shaft 157 which, in turn, is operated by cam 45 by means of roller follower 205 which is secured to shaft 157 and spring 158. It is readily seen by this method that if ratchet wheel 61 is stationary that the arms 142 will not be released from their locked position thereby keeping the brushes on the commutator and the light burning, indicating a runner at base. This will be a steadily glowing light due to the fact that the switch 128 will be closed and will cut the flashing commutator 144 out of the circuit and the runner will be considered "safe". Shaft 157 also carries a cam 160 which has a slot in its upper surface 162 which is engaged by pawl 164, the purpose being to stop the shaft 157 from coming forward to its full extent and putting arm 142 into a locked position except when a ball causes rocker arm 112 to lift pawl 164 by means of link 166, shaft 168 and rod 64.

The reason for this being that if an operator should decide to advance his man more than one base that he would not be able to put up more men unless the ball returned either to the catcher or pitcher receptacle. At the same time this arrangement registers the swings of the bat only when the ball has been thrown from the pitcher to the catcher receptacle and struck at by the bat. If an arm 142 should make one complete revolution in its locked position it then will be tripped by cam 172 which is carried by shaft 174 which also is attached to arm 176 which will cause pawl 78 to rotate ratchet wheel one tooth by means of link 178 and bell crank 180 thereby registering one run.

Scoring means

Cam 182 is fixed by a set screw to shaft 100 which indicates the running score by means of drum 184 and ratchet 79 and can be adjusted to contact lever 186 at a desired number of runs thereby forcing lever 186 outwards and releasing catch 187 thus causing spring 188 to contract and pull cam 190 against crank pin 191 which in turn causes cam 190 to reciprocate, by means of the spring 188, pulling it one way and the crank pin 191 forcing it the other. Cam 190 carries a support for set screw 192 when set screw 192 reaches pawl arm 57 it holds it against the contraction of spring 130 so that arm 57 is not actuated by eccentric 56 thus the pawl 59 can not come back far enough to pick up a tooth in ratchet wheel 61. This condition ceases when pin 191 pushes set screw 192 out of range. Supported on cam 190 is a tooth 194 which is held by pawl 196 and only when shaft 157 is in its furtherest extended position pawl 196 is not engaged with tooth 194, thus allowing only the missing of a beat of pawl 59 directly after each hit.

Pawl 197 is forced away from flange 46 by means of eccentric 198 which is operated by shaft 51 and pulled toward flange by means of spring 199. The purpose of this pawl is to stop momentum of flange 46 when bases are reached.

Fork 200 is pinned to shaft 157 and is an idler on shaft 33, the sole purpose being to stop shaft 157 from rotating and allowing shaft 33 to reciprocate.

Pawl 201 is connected to shaft 168 by means of rod 202. Cam 203 is pinned to shaft 85 which carries mercury switch 82, the reason being that when arm 81 is compressed back either by the fielding device or hit mechanism, the mercury switch can not be tripped until a ball has operated the rocker arm 112 which in turn is connected to shaft 169 and finishes the game.

The game procedure

In playing my game the operator grasps hand hold 34, assuming the game to be released into playing condition by the manual operation of the coin mechanism 68, and he waits until the pitcher mechanism discharges ball 24. When the ball gets into the position deemed suitable the operator presses down on handle 34, this through the mechanism described, swings bat 20 in a counter-clockwise direction just as would a right-handed batter. If the timing of the strike is proper, as in baseball, the ball will be driven out into the playing field. The direction, however, which the ball takes will be a function of the exact timing of the bat as the ball tends to rebound in the same manner a baseball does. Therefore, if the batter strikes the ball a little early the ball will be driven out in the direction of the first baseman. If he is late with his strike it will be driven out in the direction of the third baseman. Now, usually if the ball is driven directly into the pitcher's mechanism, it is stopped and the man will invariably be put out. If the ball, however, hits either of the basemen bumpers 204, or 205, or the fielder bumpers as 206, 207, 209, 210, 211, or 212, the ball will be directed backwardly where, by gravity, it will come to rest in either the pitcher or catcher mechanism. The ideal batting stroke is to place the ball between the basemen bumpers and the fielder retarding means. This allows the ball to come up and engage the curved end corner members 214, or 215 where it may be directed into the home run device 216, or may follow down through between bumpers 206, and 207. Now, these bumpers are preferably made of resilient material such as rubber, adequately supported as against damage, and there is a marked tendency for the ball, which is normally a ball bearing, to oscillate between the two and thus be retarded, then it may slip through between the adjacent ends of the retarding devices and either go clear on through to the pitcher device or oscillate between the next set of bumpers as 209, and 210; from there it may go directly into the pitcher mechanism or rebound between devices 211 and 212.

The scoring device, of which member 44 is the principal unit, travels at a substantially uniform speed and the amount of time it takes to return the ball to the pitcher determines how far the runner can run around the bases just as is true in the game of baseball. Now, it should be the intention of the operator to keep his men running as long as the ball is not in the pitcher's box. This he can do by keeping handle 34 depressed. However, if he should hold the handle down too long the ball may be returned unexpectedly and his runner, if off base, put out. This situation in itself is very similar to the way the game of baseball is played. It is this matter of judgment and skill in operating the machine that makes this game one of skill rather than a game of chance.

The home run device 216 is provided with a plunger 217 which is under direct control of handle 34 by means of rod 218 which is shown broken away in Figure 2. Therefore it is the operator's intent to keep the plunger 217 retracted in its downward position so that the ball can come to rest in the opening normally filled by the plunger. It naturally follows that as long as the handle 34 is held down and the ball is held in the home run device the rotary indicating mechanism will continue to function and all runners on base will be brought home. As soon as the last runner is home the home run device can be released as there is no further purpose in keeping the ball out of play.

Figure 21:
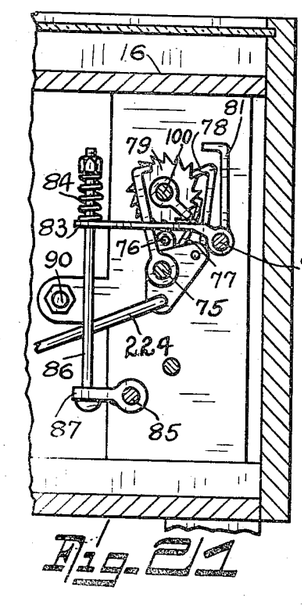

The visible scoring means is actuated by nut 220 which is secured on shaft 157. Shaft 157 is free to slide through an opening in bell crank 221 which is pivoted on the fixed pivot 222. When the pitcher or catcher mechanism 112 is tripped shaft 168 is actuated through rod 64 which in turn actuates cam 65, through rod 166, thus lifting lug 164 out of slot 162 formed in member 160. This permits shaft 157 to slide toward the lower end of the machine under urgence of spring 158. This in turn causes nut 220 to strike bell crank 221 and thus actuate rod 224. This movement operates mechanism of the type shown in Figure 21 turning hollow shaft 225 and indicating a hit on drum 226. Shaft 100 is actuated by a similar mechanism scoring the runs on drum 184. The run scorer has an additional timing element shown in Figure 15 it being actuated by dog 228 which is actuated by cam 229 and revolves ratchet 230 in a step by step movement. This ratchet acting as a crank for rod 232 actuates, through dogs 77 and 78, the ratchet 79 mounted on shaft 100. A lug 234 secured to it the ratchet 79 trips lever 81 thus partially revolving shaft 74 which in turn has secured to it the mercury switch 82. This serves to stop the game when a given period of time has elapsed. A similar mechanism operates switch 82 when a predetermined number of hits has been secured. This game is subject to considerable variation. I have found it an acceptable arrangement, however, to allot to the operator a certain definite number of swings of the bat. This may be, for instance, 12 and then it is up to the operator to see how many swings of the bat can be converted into hits and runs. If the swinging bat misses the ball the batter is considered as being out. When the batter misses the ball it is caught by the catching mechanism and then returned to the pitcher, the control mechanism for the lights is tripped, and the lights are extinguished. It is only this one aspect of the game which is different from baseball. But it has been found that to have a game that would be entertaining to the public it must be simplified and this represents practically the only variation from the standard game of baseball.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a baseball game apparatus the combination with an inclined playing deck having a pitching device, a receiving and returning device, power operated mechanism for ejecting a ball from said devices, and a manually operated swinging-bat, all located at the lower portion of the deck, of a plurality of ball retarding devices located on the deck and spaced at intervals in the path of movement of a ball projected from the bat.

2. In a baseball game apparatus, the combination with an inclined playing deck having a pitching device, a receiving and returning device, power operated mechanism for ejecting a ball from each of said devices, and a manually operated swinging-bat, of means for controlling the operation of the power operated mechanism, and two series of bumpers located on the deck with the bumpers of each series spaced at successive intervals from the swinging-bat.

3. In a baseball game apparatus, the combination with an inclined playing deck having a pitching device, a receiving and returning device, power operated mechanism for ejecting a ball from each of said devices, means for controlling the operation of said power operated mechanism, and a manually operated swinging-bat, of a plurality of resilient bumpers located on the deck and spaced from the swinging-bat, and some of said bumpers being in two series with the bumpers of each series spaced at successive intervals from the swinging-bat and in the path of movement of a ball projected from the swinging-bat.

4. In a baseball game apparatus, the combination with an inclined playing deck having lights adapted to indicate bases and also lights intermediate the base-lights to indicate base-runners, of a pitching device, a receiving and returning device, power operated mechanism for ejecting a ball from said devices and control means for said power operated mechanism, a manually operated swinging-bat, and means co-acting with said power operated means for controlling said lights to indicate plays and the progress of the game.

5. In a baseball game apparatus, the combination with a deck having a series of lights indicating bases and other lights indicating base-runners, of means for controlling said lights to indicate plays and the advancement of runners, a swinging-bat, and a manually controlled lever for swinging the bat, and operative connections between the lever and said control means whereby the light control means will operate continuously as long as said lever is properly manipulated.

6. In a baseball game apparatus, the combination with a deck having a series of base lights and a plurality of base-runner lights, a swinging-bat, a manually controlled lever for swinging the bat, and operative connections between said lever and the lights for illuminating the latter, of a home-run device located on the outfield of the deck and provided with an opening to receive a ball, means for normally closing said opening, and means adapted to be actuated by the swinging-bat-lever for opening said device.

7. In a baseball game apparatus, the combination of an inclined playing deck, a pitching device, a catching and returning device, power operated means for ejecting a ball from each of said devices, and means for actuating said power operated means, a swinging-bat and a manually operated lever for said bat, said deck having a series of base-lights and a series of base-runner lights, operative connections controlled by said lever for illuminating said lights, a home-run device located in the outfield of the deck and provided with an opening to receive the ball, means for closing said opening, and means actuated by said lever for opening said device.

8. In a baseball game apparatus, the combination of a playing deck having a series of electric lights to indicate base-runners, a swinging-bat and manually operating means therefor, a selecting and controlling unit for said lights and operative connections between said operating means and unit, said unit including a fixed commutator plate, a revolvable cam plate having a plurality of cams thereon, a selector plate and a revolvable release cam-unit, and a plurality of brushes adapted to engage said commutator plate and to be disengaged from said plate by said release unit.

9. In a baseball game apparatus, the combination of an inclined playing deck, a pitching device, a catching and returning device, power operated means for ejecting a ball from each of said devices, and means for actuating said power operated means, a swingable bat located above the deck, operating mechanism below the deck for said bat comprising a supporting crank, a looped-lever-arm adapted to engage and partially turn said crank, spring actuated means acting on the lever arm to complete the initial throw of the arm, and a manually controlled lever for operating the lever arm and spring actuated means.

FRANK R. CHESTER.